(12) United States Patent
Yu

(10) Patent No.: US 12,340,455 B2
(45) Date of Patent: Jun. 24, 2025

(54) DISPLAY CONTROL METHOD, NON-TRANSITORY COMPUTER-READABLE STORAGE MEDIUM, AND ELECTRONIC DEVICE

(71) Applicant: GUANGDONG OPPO MOBILE TELECOMMUNICATIONS CORP., LTD., Guangdong (CN)

(72) Inventor: Wei Yu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 238 days.

(21) Appl. No.: 18/318,258

(22) Filed: May 16, 2023

(65) Prior Publication Data
US 2023/0298245 A1   Sep. 21, 2023

Related U.S. Application Data

(63) Continuation of application No. PCT/CN2021/117767, filed on Sep. 10, 2021.

(30) Foreign Application Priority Data

Nov. 16, 2020   (CN) .......................... 202011281034.4

(51) Int. Cl.
G06T 13/80 (2011.01)
G06T 3/40 (2024.01)

(52) U.S. Cl.
CPC ................ G06T 13/80 (2013.01); G06T 3/40 (2013.01); G06T 2210/62 (2013.01)

(58) Field of Classification Search
CPC ....... G06T 13/80; G06T 3/40; G06T 2210/62; G06F 2203/04806; G06F 1/1624;
(Continued)

(56) References Cited

U.S. PATENT DOCUMENTS

2014/0223271 A1   8/2014   Racklyeft
2014/0380186 A1   12/2014   Kim et al.
(Continued)

FOREIGN PATENT DOCUMENTS

CN   105630510 A   6/2016
CN   107331296 A   11/2017
(Continued)

OTHER PUBLICATIONS

Stewjacks: Avoid layout change animations in custom view, that's updated in the WindowManager [Retrieved from the Internet] <URL: https://stackoverflow.com/questions/31338359/avoid-layout-change-animations-in-custom-view-thats-updated-in-the-windowmanag?rq=1> (Year: 2015).*
(Continued)

*Primary Examiner* — King Y Poon
*Assistant Examiner* — Vincent Alexander Providence
(74) *Attorney, Agent, or Firm* — Ladas & Parry, LLP

(57) ABSTRACT

A display control method, a non-transitory computer-readable storage medium, and an electronic device. The method includes: determining a foreground application in response to detecting that the electronic device starts to execute a screen adjustment operation, wherein the screen adjustment operation is configured to adjust the screen size of the flexible display screen; controlling the foreground application to play transition animation in an execution process of the screen adjustment operation, wherein the size of display content of the transition animation is dynamically adjusted with the change of the screen size to adapt the display content to the screen size; and redrawing and displaying the window of the foreground application according to the screen size which has been adjusted by the screen adjustment operation in response to the screen adjustment operation being ended.

17 Claims, 7 Drawing Sheets

(58) Field of Classification Search
CPC .... G06F 1/1652; G06F 1/1677; G06F 3/0481; G06F 3/04845; G06F 3/147; G06F 3/1423; G09G 2340/14; G09G 5/005; G09G 2340/04; G09G 2354/00; G09G 2380/02; G09G 3/035
See application file for complete search history.

(56) References Cited

U.S. PATENT DOCUMENTS

| | | |
|---|---|---|
| 2018/0052579 A1 | 2/2018 | Rakshit |
| 2019/0384438 A1* | 12/2019 | Park ............... G06F 3/0485 |

FOREIGN PATENT DOCUMENTS

| | | |
|---|---|---|
| CN | 107870929 A | 4/2018 |
| CN | 108735100 A | 11/2018 |
| CN | 109542568 A | 3/2019 |
| CN | 111459367 A | 7/2020 |
| CN | 112269555 A | 1/2021 |
| WO | 2020061783 A1 | 4/2020 |

OTHER PUBLICATIONS

Xiaobai: Hold a suite! Huawei MateX experience Compared to Samsung Fold, who is folding KING? [Retrieved from the Internet] <URL: https://www.youtube.com/watch?v=6-tu-vkpO4k> (Year: 2019).*

Chinese First Office Action and search report from the corresponding Chinese Application No. 202011281034.4, mailed Jan. 30, 2022 with English translation provided by Global dossier (28 pages).

"Huawei MateX gaming experience, seamless single screen full screen switching is very smooth, don't you want to feel it?" «https://v.youku.com/v_show/id_XNDQ1MTE1MjExMg==» ,Nov. 29, 2019, Lei Lei Kan Technology; the screenshots of the video considered relevant and provided by the Chinese Examiner are included in the Office Action of Jan. 30, 2022 in the corresponding Chinese Application No. 202011281034.4, submitted herein.

Chinese second Office Action from the correspondingChinese Application No. 202011281034.4, mailed Oct. 10, 2022 with English translation provided by Global dossier (25 pages).

International Search Report and Written Opinion from International Application No. PCT/CN2021/117767, mailed Nov. 26, 2021 (14 pages) with English translation provided by WIPO.

Chinese Rejection decision from the corresponding Application No. 202011281034.4 , mailed Mar. 31, 2023 with translation provide by the applicant's foreign counsel (21 pages).

1 European Search Report, European Patent Application No. 21890788.9, mailed May 7, 2024 (16 pages).

* cited by examiner

DISPLAY CONTROL METHOD, NON-TRANSITORY COMPUTER-READABLE STORAGE MEDIUM, AND ELECTRONIC DEVICE

CROSS-REFERENCE TO RELATED APPLICATIONS

The present disclosure is a continuation-application of International (PCT) Patent Application No. PCT/CN2021/117767 filed on Sep. 10, 2021, which claims foreign priority to Chinese Patent Application No. 202011281034.4, filed on Nov. 16, 2020, the disclosures of which are herein incorporated by reference in their entireties.

TECHNICAL FIELD

The present disclosure relates to the technical field of electronic devices, in particular to a display control method, a non-transitory computer-readable storage medium, and an electronic device.

BACKGROUND

With the development of electronic device technology, intelligent terminals such as smart phones, tablets and the like are developing in a direction of bigger display screens. Bigger display screens can deliver more sufficient contents, make human-computer interaction more realistic and efficient, and bring a better user experience. In addition, to make it easier to carry the intelligent terminals, foldable terminals and flexible display terminals are born, which meet the portability requirements of intelligent terminals with big display screens to a great extent.

SUMMARY

A display control method is provided, which can be applied to an electronic device with a flexible display screen. The method may include: when it is detected that the electronic device starts to execute a screen adjustment operation, a foreground application is determined, wherein, the screen adjustment operation is configured to adjust the screen size of the flexible display screen; the foreground application is controlled to play transition animation in an execution process of the screen adjustment operation; wherein, in order to adapt the display content to the screen size, the size of the display content of the transition animation is dynamically adjusted with the change of the screen size; when the screen adjustment operation is ended, the window of the foreground application is redrawn and displayed according to screen size which has been adjusted by the screen adjustment operation.

A non-transitory computer-readable storage medium having stored instructions that is executed by a processor of a computer, cause the processor to determine a foreground application in response to detecting that the electronic device starts to execute a screen adjustment operation, wherein the screen adjustment operation is configured to adjust the screen size of the flexible display screen; control the foreground application to play transition animation in an execution process of the screen adjustment operation, wherein the size of display content of the transition animation is dynamically adjusted with the change of the screen size to adapt the display content to the screen size; and redraw and display the window of the foreground application according to the screen size which has been adjusted by the screen adjustment operation in response to the screen adjustment operation being ended.

An electronic device is provided, which includes a processor and a memory. The memory configured to store instructions which, when executed by the processor, cause the processor to determine a foreground application in response to detecting that an electronic device starts to execute a screen adjustment operation; wherein, the screen adjustment operation is configured to adjust the screen size of the flexible display screen; control the foreground application to play transition animation in an execution process of the screen adjustment operation; wherein, the size of display content of the transition animation is dynamically adjusted with the change of the screen size to adapt the display content to the screen size; and redraw and display the window of the foreground application according to the screen size which has been adjusted by the screen adjustment operation in response to the screen adjustment operation being ended.

BRIEF DESCRIPTION OF THE DRAWINGS

In order to more clearly illustrate technical solutions in embodiments of the application, a brief description of the drawings required in the description of the embodiments will be given below. Obviously, the drawings described below are only some of the embodiments of this disclosure, and other drawings can be obtained according to these drawings without any creative work by those skilled in the art.

DETAILED DESCRIPTION

Figure 1:
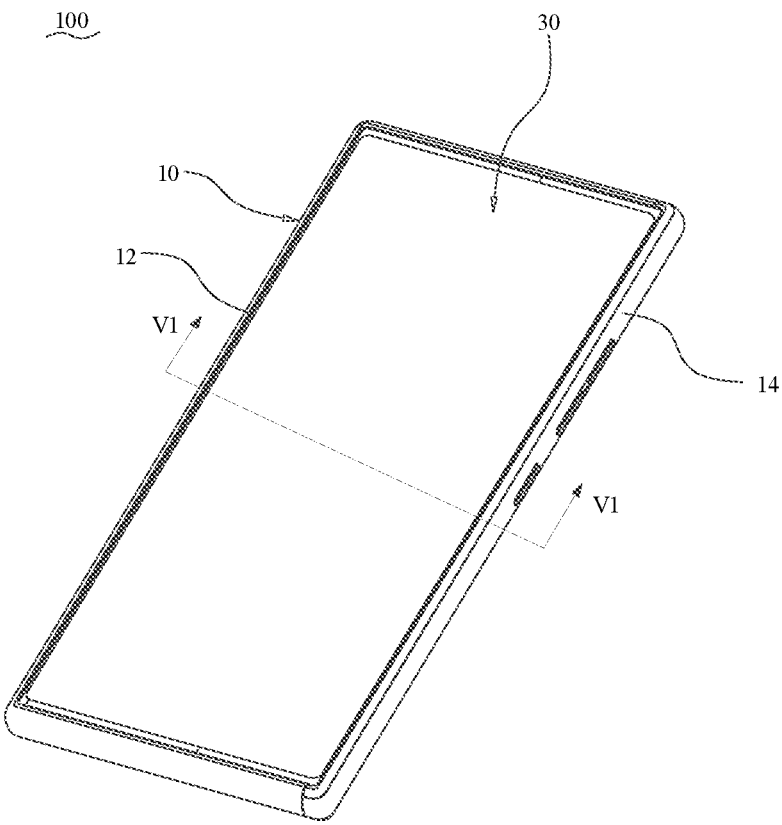
FIG. 1 is a structural schematic view of an electronic device provided by some embodiments of the present disclosure.

In order to make the purposes, technical solutions and advantages of the present disclosure clearer, the embodiments of the present disclosure will be further described in detail below in combination with the accompanying figures. Obviously, the embodiments described are only a portion of this disclosure and not the entire embodiments. Based on the embodiments of the present disclosure, all other embodiments acquired by technical personnel in this art without creative work shall fall within the scope of protection in this disclosure.

Reference to "embodiment" in this disclosure means that, specific features, construction or characteristics described in conjunction with embodiment may be included in at least one embodiment of the present disclosure. The occurrence of the phrase at various locations in the specification does not necessarily refer to the same embodiment, nor is it a separate or alternative embodiment that is mutually exclusive with other embodiments. It is understood, both explicitly and implicitly, by technical personnel in this art that embodiments described herein may be combined with other embodiments.

In some embodiments of the present disclosure, a display control method is provided, whose execution subject may be the display control apparatus provided by some embodiments of the present disclosure, or an electronic device integrated with the display control apparatus, wherein the display control apparatus can be realized by hardware or software.

In some embodiments of the present disclosure, a display control method can be applied to an electronic device with a flexible display screen and includes: when it is detected that the electronic device starts to execute a screen adjustment operation, a foreground application is determined, wherein, the screen adjustment operation is configured to adjust the screen size of the flexible display screen; the foreground application is controlled to play transition animation in an execution process of the screen adjustment operation; wherein, in order to adapt the display content to the screen size, the size of the display content of the transition animation is dynamically adjusted with the change of screen size; when the screen adjustment operation is ended, the window of the foreground application is redrawn and displayed according to size of the screen which has been adjusted by the screen adjustment operation.

In some embodiments, drawing the display content of the transition animation in real time according to the display picture of the foreground application in the process of playing the transition animation.

In some embodiments, before the foreground application is controlled to play transition animation in an execution process of the screen adjustment operation, further includes: when it is detected that the electronic device starts to execute the screen adjustment operation, taking a screenshot of the display picture of the current screen to obtain a first image. The foreground application is controlled to play transition animation in an execution process of the screen adjustment operation includes: displaying the first image and controlling the foreground application to draw the transition animation; when drawing the transition animation is completed, the display of the first image is ended and the transition animation is played until the screen adjustment operation is ended.

In some embodiments, when the screen adjustment operation is ended, the window of the foreground application is redrawn and displayed according to the screen size which has been adjusted by the screen adjustment operation, includes: when the screen adjustment operation is ended, taking a screenshot of the display picture of the current display to obtain a second image; displaying the second image, redrawing and rearranging the window of the foreground application according to screen size which has been adjusted by the screen adjustment operation; after the redrawing is completed, terminating the display of the second image and displaying the redrawn window of the foreground application.

In some embodiments, the foreground application is controlled to play transition animation in an execution process of the screen adjustment operation includes: determining the maximum screen display size in the process of the screen adjustment operation and the maximum screen display size is set as the target size of the window of the foreground application; the foreground application is controlled to play the transition animation in the window with the target size in the execution process of the screen adjustment operation.

In some embodiments, the screen adjustment operation can be a telescopic operation, the telescopic operation contains a stretching operation and a contracting operation; determining the maximum screen display size in the process of the screen adjustment operation and the maximum screen display size is set as the target size of the window of the foreground application includes: when the screen adjustment operation is the stretching operation, determining a first screen display size which has been stretched by the stretching operation, and the first screen display size is set as the target size of the window of the foreground application; when the screen adjustment operation is the contracting operation, determining a second screen display size which has been stretched by the stretching operation, and the second screen display size is set to the target size of the window of the foreground application.

In some embodiments, before the foreground application is controlled to play transition animation in an execution process of the screen adjustment operation includes: detecting whether the foreground application supports the adaptive play of the transition animation; in response to the foreground application supporting the adaptive play of the transition animation, the foreground application is controlled to play the transition animation in the execution process of the screen adjustment operation; otherwise, taking a screenshot of the display picture of the current screen to obtain a third image; acquiring the first display interface of the foreground application which has been adjusted by the adjustment operation, performing a scaling operation to the first display interface to obtain a second display interface which is adaptive to the screen size which has not been adjusted by the screen adjustment operation; display the third image, and display the second display interface underneath the third image; during the execution process of the screen adjustment operation, controlling the scaling operation of the third image and the second display interface through a system animation view, so as to make the size of the third image and the second display interface match the screen size. In the process of the scaling operation, the transparency of the third image is adjusted from 100% to 0, and adjusting the transparency of the second display interface from 0 to 100%.

In some embodiments, detecting whether the foreground application supports the adaptive play of the transition animations includes: detecting whether a preset identifier is carried in a window creation request sent by the foreground application program to an application framework layer, wherein, in response to the preset identifier is carried in the window creation request, it is determined that the foreground application program supports the adaptive play of the transition animation; otherwise, it is determined that the foreground application program does not support the adaptive play of the transition animation.

A display control method, which can be applied to an electronic device with a flexible display screen, the flexible display screen can be bent or stretched out and drew back to change the size of the display area. For example, the flexible display screen can be a foldable screen, with which the electronic device can be switched from a large screen to a small screen by bending and from a small screen to a large screen by stretching. Alternatively, the flexible display screen can be a telescopic screen, and the electronic device can be switched from a small screen to a large screen by a stretching operation, and from a large screen to a small screen by a contracting operation. In the following disclosure, the flexible display screen is used as an example of the display control method of the present disclosure.

Figure 2:
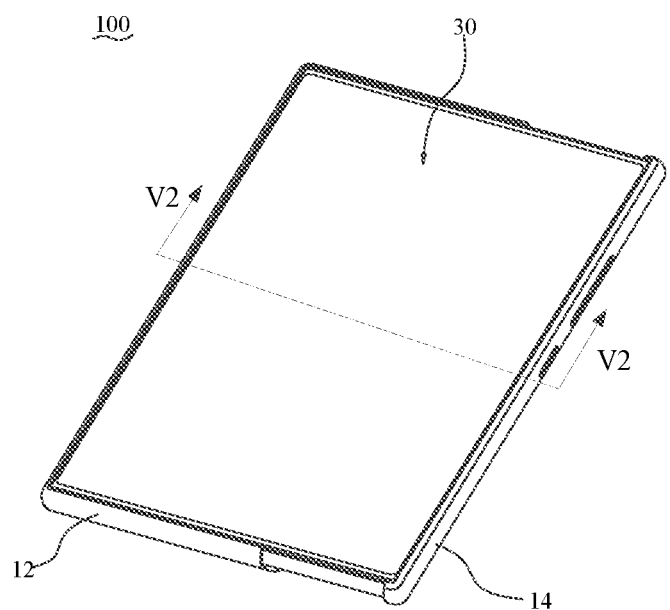
FIG. 2 is another structural schematic view of the electronic device provided by some embodiments of the present disclosure.

As shown in FIG. 1, FIG. 1 is a structural schematic view of an electronic device provided by some embodiments of the present disclosure. The electronic device can be a smartphone, a tablet, a PDA, a laptop, a desktop computer, or the like. In the example in FIG. 1, the electronic device has a flexible display screen, one end of which is arranged on a reel, enabling part of the flexible display screen to be wound around the reel, which can be used to reel the flexible display screen in and release the flexible display screen, thereby expanding the display portion of the flexible display screen assembly. The flexible display screen can be extended or contracted in a direction perpendicular to the reel. For example, as shown in FIG. 2, FIG. 2 is another structural schematic view of the electronic device provided by some embodiments of the present disclosure. FIG. 2 illustrates that the electronic device has its flexible display screen stretched out. When the user needs to use the large screen, the display part of the flexible display screen can be extended to improve the user's operating experience. At the same time, when the large screen is not needed, the display part can be unextended, so that the size of the whole device is small and easy to carry.

It should be noted that the telescopic direction of the flexible display screen shown in FIG. 1 above is only for example. In other embodiments, the flexible display screen can also be set to stretch out and draw back along the vertical direction when the device is vertically held by users.

When the electronic device detects the beginning of the telescopic operation, the electronic device determines the foreground application, and control the foreground application to play a transition animation in the execution process of the screen adjustment operation, to realize the transition effect through the animation, and avoid the abrupt change of the display content in the process of switching from a large screen to a small screen or from a small screen to a large screen, due to the change in the size of the display interface.

Figure 3:
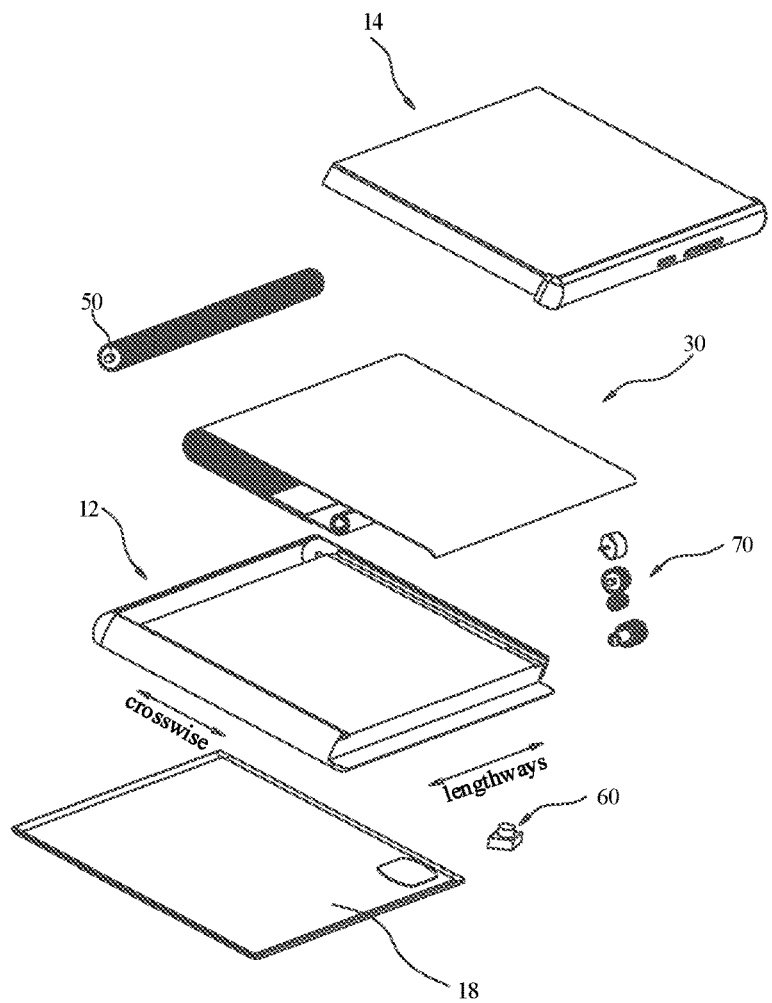
FIG. 3 is a perspective exploded view of the electronic device provided by some embodiments of the present disclosure.

FIG. 1 to FIG. 3 illustrate that the electronic device 100 includes a shell assembly 10, a flexible display screen 30, a driving part 50 and a driving mechanism 70 in this embodiment.

The shell assembly 10 has a hollow structure. The driving part 50, the driving mechanism 70, a camera 60 and so on can be set in the shell assembly 10. It is understandable that the electronic device 100 in the embodiments of the present disclosure includes but is not limited to a mobile phone, a tablet and other mobile terminal or other portable electronic device. In this paper, the electronic device 100 is taken as the mobile phone for example.

In this embodiment, the shell assembly 10 includes a first shell 12 and a second shell 14. The first shell 12 and the second shell 14 are capable of relative motion. Specifically, in the present embodiment, the first shell 12 and the second shell 14 are slidably connected, that is, the second shell 14 is capable of sliding relative to the first shell 12.

Figure 4:
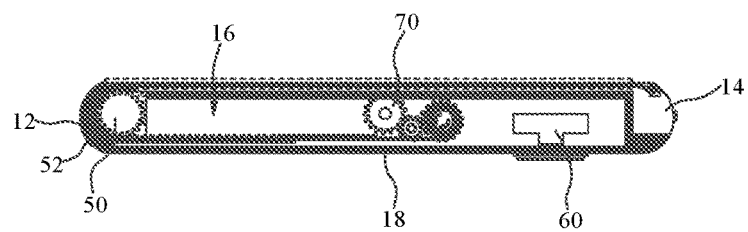
FIG. 4 is a cutaway view of the electronic device in FIG. 1 along V1-V1.
Figure 5:
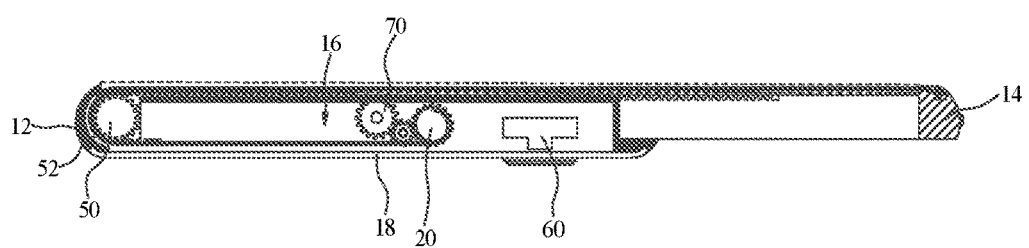
FIG. 5 is a cutaway view of the electronic device in FIG. 2 along V2-V2.

As shown in FIG. 4 and FIG. 5, the first shell 12 and the second shell 14 jointly form an accommodating space 16. The accommodating space 16 can be configured to place the driving part 50, the camera 60, the driving mechanism 70 and the other parts. The shell assembly 10 may also include a rear cover 18 which, together with the first shell 12 and the second shell 14, form an accommodating space 16.

The driving part 50 is arranged in the second shell 14. One end of the flexible display screen 30 is arranged in the first shell 12, the flexible display screen 30 bypasses the driving part 50, and the other end of the flexible display screen 30 is arranged in the accommodating space 16, so that part of the flexible display screen 30 can be hidden in the accommodating space 16, and the part of the flexible display screen 30 hidden in the accommodating space 16 may not be lit. When the distance of the first shell 12 from the second shell 14 is relatively increasing, the flexible display screen 30 can be driven to unfold through the driving part 50, so that more parts of the flexible display screen 30 can be exposed outside the accommodating space 16. The part of the flexible display screen 30 exposed to the outside of the accommodating space 16 is lit to enlarge the display area presented by the electronic device 100.

The driving part 50 can has a rotating shaft structure whose outer part has teeth 52. The flexible display screen 30 can be linked with the driving part 50 through meshing or other ways. When the distance of the first shell 12 from the second shell 14 is relatively increasing, part of the flexible display screen 30 meshed on the driving part 50 can be moved and expanded driven by the driving part 50.

It can be understood that the driving part 50 can also be a circular shaft without the teeth 52. When the distance of the first shell 12 from the second shell 14 is relatively increasing, part of the flexible display screen 30 which is winded (wrap around) on the driving part 50 can be stretched out through the driving part 50, so as to expose more parts of the flexible display screen outside the accommodating space 16 and be in a flat state. Specifically, the driving part 50 can be rotationally arranged in the second shell 14. When the flexible display screen 30 is gradually stretched out, the driving part 50 can rotate with the movement of the flexible display screen 30. In other embodiments, the driver part 50 may also be fixed on the second shell 14, and the driver part 50 has a smooth surface. When the flexible display screen 30 is stretched out, the driving part 50 can slidably contact the flexible display screen 30 through its smooth surface.

When the first shell 12 and the second shell 14 relatively get close, the flexible display screen 30 can be retracted by the driving part 50. Alternatively, the electronic device 100 can also include a reset part (not shown), the end of the flexible display screen 30 housed in the accommodating space 16 can be moved in combination with the reset part, when the first shell 12 and the second shell 14 relatively get close, the reset part drives the flexible display screen 30 to reset, and then makes part of the flexible display screen be retracted to the accommodating space 16.

In the present embodiment, the driving mechanism 70 can be set in the accommodating space 16, the driving mechanism 70 can move with the second shell 14 together, and the driving mechanism 70 can be configured to drive the second shell 14 to move away from the first shell 12, so as to drive the flexible display screen 30 to stretch. It is understandable that the driving mechanism 70 can also be omitted, and the user can make the first shell 12 and the second shell 14 move relatively through manual means or the like directly.

Figure 6:
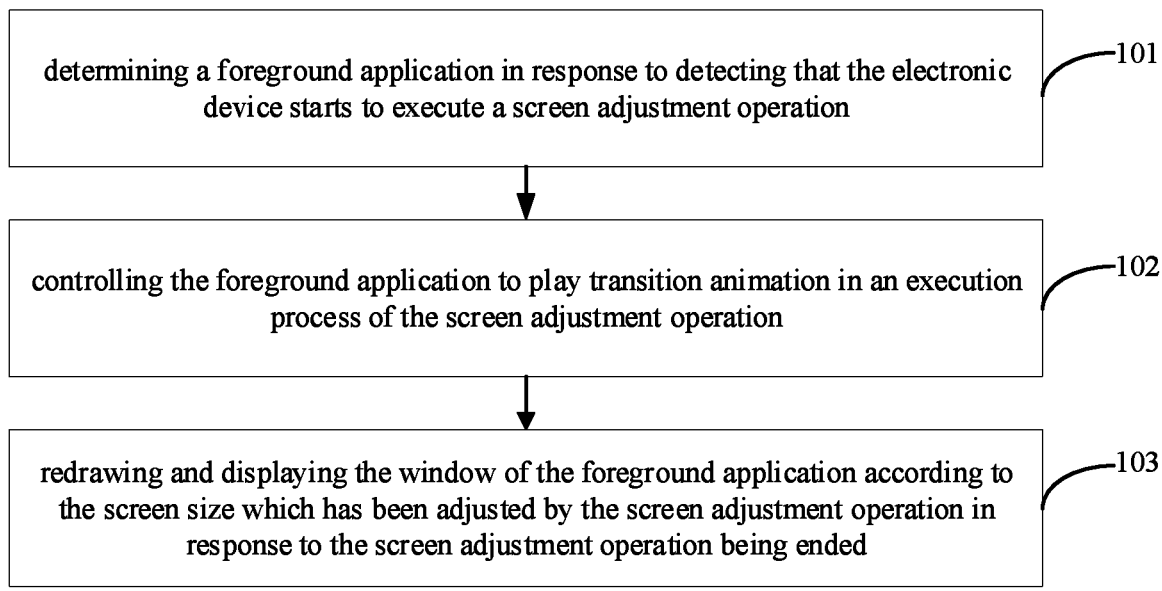
FIG. 6 is a first flow chart of a display control method provided by some embodiments of the present disclosure.

As shown in FIG. 6, FIG. 6 is a first flow chart of a display control method provided by some embodiments of the present disclosure. As shown in FIG. 6, the display control method provided in the embodiment of the present disclosure can include the following operations.

In operation 101, determining a foreground application in response to detecting that the electronic device starts to execute a screen adjustment operation, wherein the screen adjustment operation is configured to adjust the screen size of the flexible display screen.

It should be noted that the application in the embodiment of the present disclosure is an application in a broad sense, including not only the third-party applications installed by the user, such as WeChat, audio player and other apps (applications), but also some system-level applications. For example, the desktop, notification bar, and screen locker are included in the applications defined in the present disclosure.

In some embodiments of the present disclosure, determining which application is running in the foreground when it is detected that the electronic device starts to execute a screen adjustment operation. While the flexible display screen contracts, the screen size may decrease, that is, the display area of the display screen may decrease.

For example, assuming that the electronic device is in the large-screen state and the user triggers a contracting command according to a preset operation, when the electronic device detects the contracting command, it starts to perform the screen adjustment operation and the screen adjustment operation is the contracting operation. At the same time, the electronic device determines the foreground application, assuming that the current foreground application is a video player that the user is using to watch a video.

In operation 102, controlling the foreground application to play transition animation in an execution process of the screen adjustment operation; wherein the size of display content of the transition animation is dynamically adjusted with the change of the screen size to adapt the display content to the screen size.

The process of determining the foreground application can be completed in a very short time which can be almost negligible, and the operation of determining the foreground application can be performed as soon as the contracting command is detected. After the foreground application is determined, controlling the foreground application to play the transition animation during the execution process of the screen adjustment operation.

It should be noted that the transition animation in the present embodiment is not played by system animation. Instead, an adaptive transition animation needs to be set in advance by the foreground application, which is played when the screen is being stretched out and drawn back. In addition, some of the transition animation play parameters may need to be adapted to the parameters of the telescopic operation, so as to realize that the playtime of the transition animation is just equal to the duration of the screen adjustment operation, and the size of the display content of the transition animation can also be adjusted dynamically with the change of the screen size. Based on this, when designing the application, the developer of the foreground application needs to set the parameters related to the transition animation according to some parameters of the contracting operation of the electronic device, such as the contracting speed of the display screen, the duration of the contracting operation, and the screen size before and after the contracting operation.

For example, based on the electronic device contracts from the large screen to the small screen within one second after the user triggers the contracting command, the duration of the transition animation should also be set to one second. In addition, the screen size before and after the contracting operation is fixed, that is to say, due to screen size before the contracting operation is fixed, once the user triggers the contracting command in the large screen state, the electronic device can only contract to a certain screen size. Therefore, the size of the display content at the end of the transition animation needs to be the same as the screen size after the contracting of the display screen. The size of the contents displayed at the beginning of the transition animation should be consistent with the screen size before the display screen contracts, and the contracting speed of the window size during the playing of the transition animation should also be consistent with the contracting speed of the display screen.

In addition to the above parameters, the transition animation can be customized by different applications to display content and animation effect as required.

For example, in one embodiment, the effect and the display content of the animation can be set in advance. For example, the specific contents displayed during the playback of the transition animation and the effect of the animation can be set according to the characteristics of the application, the specific display content can be irrelevant to the actual display content of the foreground application. It can be a specific image, text, dynamic graph, etc., to increase the interest of human-computer interface interaction.

For another example, in another embodiment, during the process of playing the transition animation, the display content of the transition animation can be drawn in real time according to the display picture of the foreground application. In the present embodiment, the animation effect of the transition animation can be set in advance, but the specific display content displayed in the animation is drawn in real time according to the actual display picture of the foreground application during the process of playing the animation. Here, in order to facilitate readers to understand the technical solution, the video player as the foreground application is taken as an example to illustrate a specific scene. The user uses the video player in the foreground to play the video, then, the user triggers the contracting command, during the contracting operation of the flexible display screen, the objects of the transition animation are the video play window and the display content in the video play window, and the animation effect is as follows: as the screen size of the display screen decreases, the video play window is reduced adaptively. In other words, during the process of screen reduction, the video play window is always the same size as the screen. With the contracting of the video play window, the video picture is drawn and displayed in the video play window in real time, and the displayed video picture also contracts with the contracting of the video window. For the user, the effect which can be seen is as follows: During the contracting of the display screen, the video play window becomes smaller with the contracting operation, and the video contents displayed in the window plays normally, but the window becomes smaller adaptively, which does not affect the user's viewing of the video.

The transition animation is illustrated above by using the contracting of a flexible display screen as an example. It is understandable that in response to the screen adjustment operation is the stretching operation, the animation is played according to the same principle as contracting. However, in the process of the stretching operation, the video play window becomes bigger with the stretching operation, and the video contents displayed in the window is played normally, but the window becomes bigger adaptively, which does not affect the user's viewing of the video.

In operation 103, redrawing and displaying the window of the foreground application according to the screen size which has been adjusted by the screen adjustment operation in response to the screen adjustment operation being ended.

In the above embodiment, during the process of playing the transition animation, even though the contents displayed in the animation window are the same as the display interfaces of the application, these display interfaces are also displayed as the animation contents. After finishing playing the animation and exiting the animation window, that is, when the screen adjustment operation is finished, it may still be necessary to redraw and display the foreground application's window according to the screen size of the screen adjustment operation.

In addition, the video player is for illustrative purposes only and does not constitute a limitation of this technical solution.

For some applications whose display interfaces are static display interfaces, for example, applications such as the system desktop, it is also possible to set the appropriate transition animation according to the display interface. For example, the foreground application is the system desktop, the animation effect is the system desktop interface size changes with the contracting or stretching of the screen adaptively, the contents of the transition animation the desktop icon (or plug-in) changes its size and/or position in real time as the system desktop interface size changes. However, this change is not realized by modifying the relevant parameters of the window management service, but according to the pre-set animation parameters. The window size of the transition animation changes with the contracting or stretching of the screen adaptively. At the same time, the icons (or plug-ins) on the system desktop displayed in the window are drawn in real time according to the changes of the animation window.

Figure 7A:
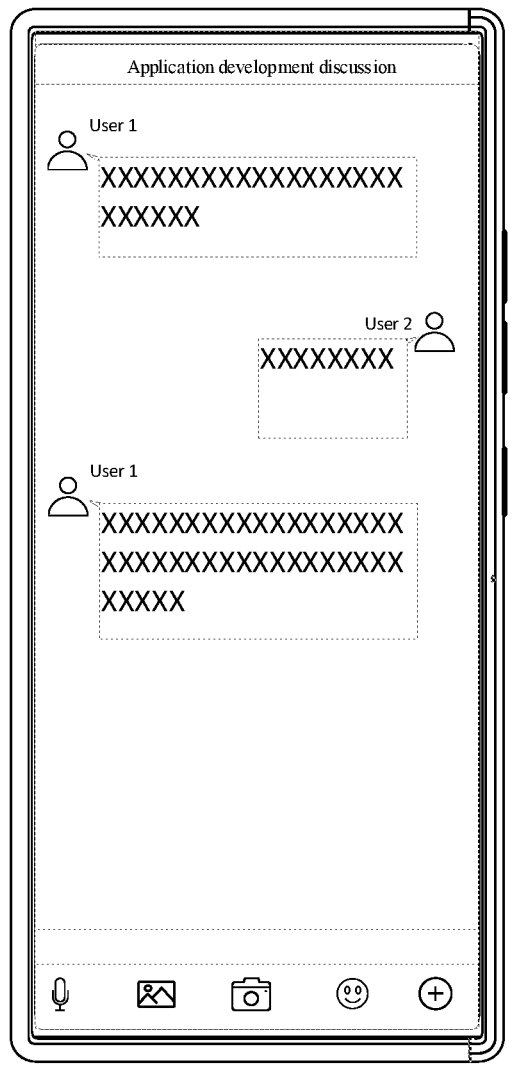
FIG. 7A is a schematic view of an interface at the beginning of a display screen stretching operation in the display control method provided by some embodiments of the present disclosure.
Figure 7B:
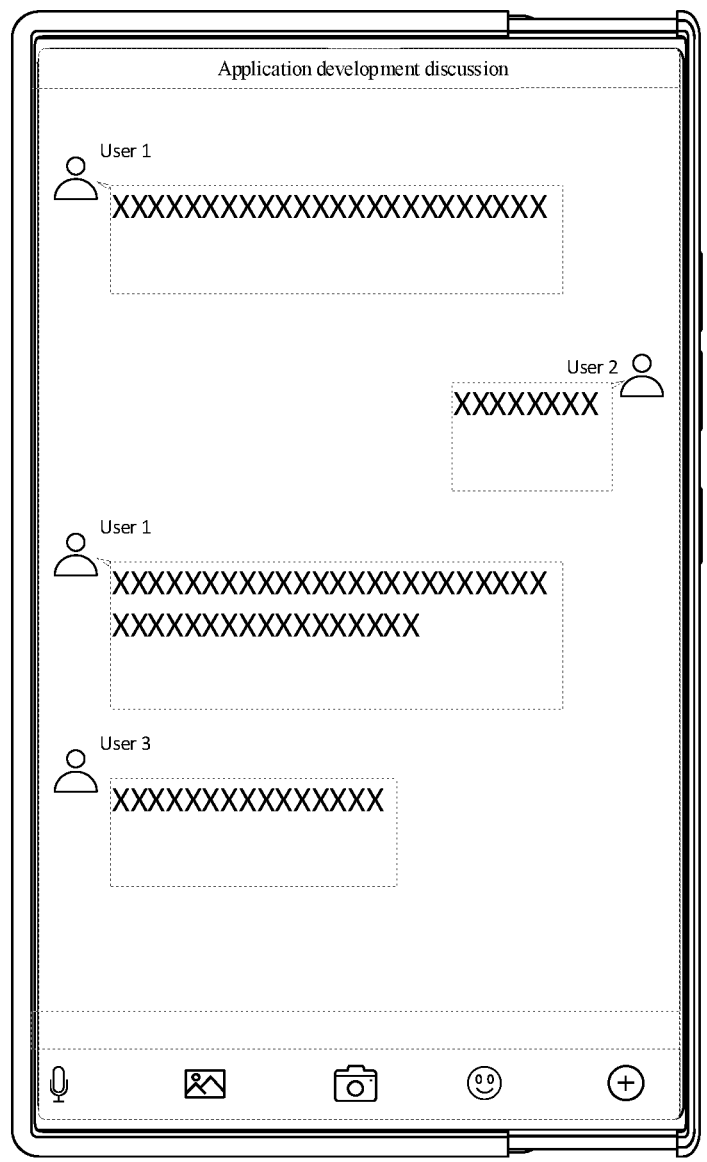
FIG. 7B is a schematic view of an interface in the execution process of the display screen stretching operation in the display control method provided by some embodiments of the present disclosure.
Figure 7C:
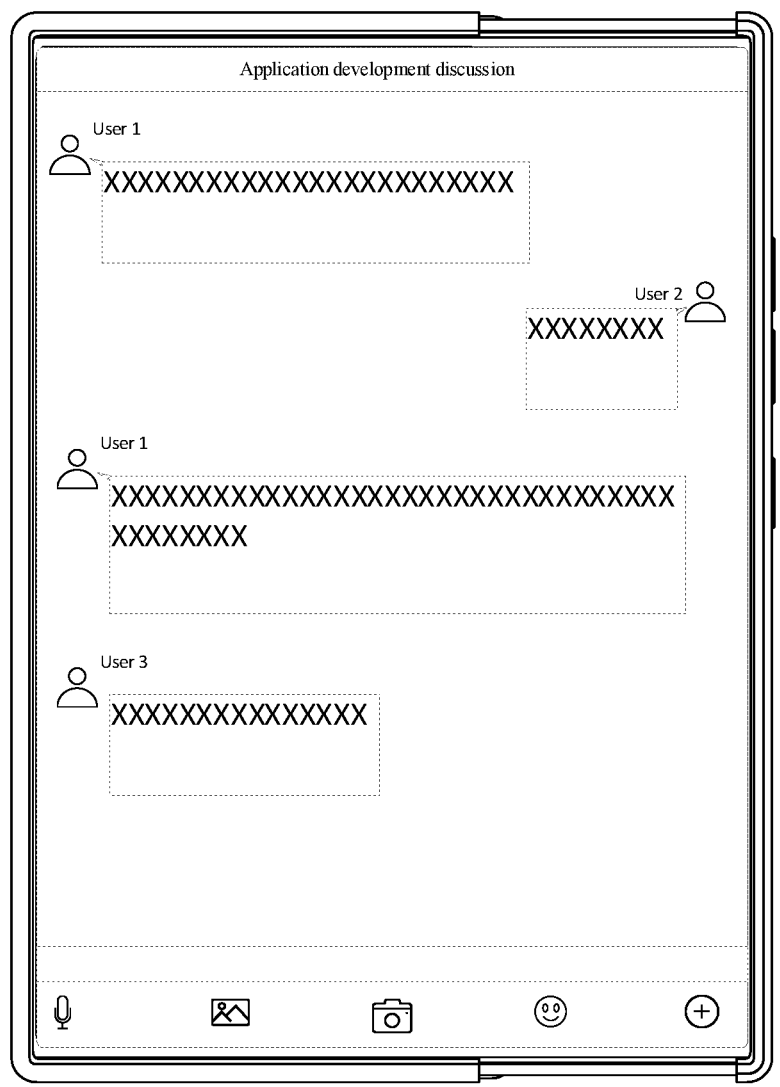
FIG. 7C is a schematic view of an interface at the ending of the display screen stretching operation in the display control method provided by some embodiments of the present disclosure.

As shown in FIG. 7A, FIG. 7B and FIG. 7C, FIG. 7A is a schematic view of an interface at the beginning of a display screen stretching operation in the display control method provided by some embodiments of the present disclosure, FIG. 7B is a schematic view of an interface in the execution process of the display screen stretching operation in the display control method provided by some embodiments of the present disclosure, and FIG. 7C is a schematic view of an interface at the ending of the display screen stretching operation in the display control method provided by some embodiments of the present disclosure. In order to facilitate readers' understanding of the technical solution, the chat interface of an instant messaging application is taken as an example here. In the process of playing the transition animation of this application, the display content of the transition animation are the actual contents of the chat interface during the stretching operation, and the animation effect is the window of the chat interface gradually borders with the horizontal telescopic of the screen. Moreover, since the animation contents is drawn in real time, a message can be displayed on the interface in time even if the message is received during the stretching process. At the same time, as the width of the screen increases, the position of controls in the interface may change as the screen stretches, for example, the gap between the controls increases, and the messages in the chat window can display more words per line.

Through the above technical solution, during the period of screen adjustment, the application running in the foreground plays the animation to realize the transition effect, avoiding the abrupt change caused by the change of the size of the display interface in the process of switching from the big screen to the small screen or from the small screen to the big screen, and realizing the smooth switching of the display interface.

In at least one embodiment, before the foreground application is controlled to play transition animation in an execution process of the screen adjustment operation, the method further includes: when it is detected that the electronic device starts to execute the screen adjustment operation, taking a screenshot of the display picture of the current screen to obtain a first image. The operation of the foreground application is controlled to play transition animation in an execution process of the screen adjustment operation includes: displaying the first image and controlling the foreground application to draw the transition animation; when drawing the transition animation is completed, the display of the first image is ended and the transition animation is played until the screen adjustment operation is ended.

When the foreground application switches from the current display interface to the animation window, it needs to draw the animation, which may cause a screen flicker. In order to avoid this phenomenon, before playing the transition animation, when it is detected that the electronic device starts to execute the screen adjustment operation, a screenshot of the display picture of the current screen is taken first, and the first image is obtained, and the first image is displayed on the current interface. That is, the first image is overlaid on top of the foreground application's window to display, and underneath the first image, the electronic device controls the foreground application to draw the transition animation. In this process, the process of drawing the transition animation is invisible to the user. When the transition animation is being drawn, the user can see the first image displayed on the foreground application. In this case, there will be no screen flicker. In response to the drawing of the transition animation is completed, the display of the first image is ended and the transition animation is played until the screen adjustment operation is ended.

It is understood that "the transition animation is played until the screen adjustment operation is ended" and "play transition animation in an execution process of the screen adjustment operation" both mean that the transition animation needs to start playing at the beginning of the screen adjustment operation and needs to finish playing at the end of the screen adjustment operation. That is, as highlighted above, the duration of the transition animation is equal to the duration of the screen adjustment operation.

In at least one embodiment, the operation of when the screen adjustment operation is ended, the window of the foreground application is redrawn and displayed according to the screen size which has been adjusted by the screen adjustment operation, includes: when the screen adjustment operation is ended, taking a screenshot of the current display to obtain a second image; displaying the second image, redrawing and displaying the window of the foreground application according to screen size which has been adjusted by the screen adjustment operation; after the redrawing is completed, terminating the display of the second image and displaying the redrawn window of the foreground application.

After the animation playing is ended, the screen may flicker when the foreground application exits an animation play screen and switches to a normal display interface. According to the principle which is similar to the above embodiments, in order to avoid screen flicker, when the screen adjustment operation is ended, a screenshot of the display picture of the current screen is taken to obtain the second image, and displaying the second image on the current interface, that is to say, the second image is overlaid on the window of the foreground application for display. Under the second image, the foreground application completes the switching from animation play screen to the normal display interface. During this process, the window of the foreground application is rearranged and redrawn according to the screen size which has been adjusted by the screen adjustment operation. After the redrawing is completed, the display of the second image is ended and the redrawn window of the foreground application is displayed. During the process of displaying the second image, the process of switching the animation play screen to the normal display interface is invisible to the user. What the user sees is the second image displayed on top of the foreground application, in which case the screen may not flicker.

In at least one embodiment, the two embodiments above can also be combined, the first image is obtained at the beginning of the screen adjustment operation through taking a screenshot, and the first image is displayed on the current interface. Underneath the first image, the electronic device controls the foreground application to draw the transition animation. When the screen adjustment operation is ended, taking a screenshot of the display picture of the current screen to get the second image, and display the second image on the current interface. Underneath the second image, the switching from the animation play screen to the normal display interface can be completed by the foreground application. Through the technical solution of the present embodiment, the system and the applications are adapted together, in the process of screen telescopic, the drawing contents are changed along with the stretching out and drawing back of the display screen (the screen size changes accordingly), and a stepless regulation of the display interface is realized from an application level.

In at least one embodiment, the operation of the foreground application is controlled to play transition animation in an execution process of the screen adjustment operation includes: determining the maximum screen display size during the screen adjustment operation and setting the maximum screen display size to the target size of the window of the foreground application; the foreground application is controlled to play the transition animation in the window with the target size during the execution of the screen adjustment operation.

For the stretching operation (or an extending operation), the maximum screen display size during the screen adjustment operation is the screen size at the end of the stretching operation, and for the contracting operation (or a bending operation), the maximum screen display size during the screen adjustment operation is the screen size at the beginning of the contracting operation.

For example, in one embodiment, the operation of determining the maximum screen display size during the screen adjustment operation and set the maximum screen display size to the target size of the window of the foreground application includes: when the screen adjustment operation is the stretching operation, determining a first screen display size which has been stretched by the stretching operation, and set the first screen display size to the target size of the window of the foreground application; when the screen adjustment operation is the contracting operation, acquiring a second screen display size which has not been contracted by the contracting operation, and set the second screen display size to the target size of the window of the foreground application.

Taking the contracting operation as an example, assuming that the contracting operation adjust the screen size from 1920*1920 to 1920*1080, when the contracting operation begins, the system sends the foreground application a first indication information which indicates the foreground application to draw the window in a size of 1920*1920 still which is the window size before the contracting operation. With the horizontal contracting of the display screen, the width of the screen gradually contracts from 1920 to 1080, but for the foreground application, the size of its "logical screen" is still 1920*1920, until the contracting operation is ended, after the animation play is finished, the system may adjust the window size parameters in the window management service, thereby the window size of the foreground application is adjusted to 1920*1080. At this time, the application rearranges according to the adjusted window size parameters, draws and displays the foreground application according to the rearranged window. That is, in this embodiment, the system provides the application with the ability to display the windows of the application outside a physical screen, that is to say, the "logical screen" can be larger than the physical screen. In the process of the screen is contracting, the application window size parameters do not decrease, and the size of the display content displayed in the transition animation is smaller than the "logical screen" size. The size of the "logical screen" is always 1920*1920, while the display content of the transition animation gradually contracts from 1920*1920 to 1920*1080 as the physical screen contracts.

On the contrary, for the stretching operation, is a process that the screen size goes from small to large. Supposing that the stretching operation adjusts the screen size from 1920*1080 to 1920*1920. When the stretching operation begins, the system adjusts the window size parameters in the window management service so that the size of the foreground application's window can be adjusted to 1920*1920. And the system sends a second indication to the foreground application that indicates the foreground application to draw the window size of the transition animation according to the stretched size of 1920*1920. At this point, the size of the physical screen is still 1920*1080, but the system provides the application with the ability to display the windows of the application outside the physical screen, which makes the "logical screen" larger than the physical screen. In the process of the screen stretching operation, the application window size parameters remain the same, and the size of the contents displayed in the transition animation gradually changes from 1920*1080 to equal 1920*1920.

It can be understood that in the above embodiments, in order to realize that the foreground application plays the transition animation when the screen is stretching out and drawing back, the application needs to be set to support the adaptive play of the transition animation at the phase of development. For applications that may not have been set for adaptation at the phase of development, an animation effect which can realize transition is also required.

Exemplarily, in one embodiment, before the foreground application is controlled to play transition animation in an execution process of the screen adjustment operation, the method may further include: detecting whether the foreground application supports the adaptive play of the transition animation; in response to the foreground application supporting the adaptive play of the transition animation, the foreground application is controlled to play transition animation in the execution process of the screen adjustment operation; otherwise, taking a screenshot of the current screen to obtain a third image; acquiring the first display interface of the foreground application which has been adjusted by the adjustment operation, performing contracting operation to the first display interface, a second display interface corresponding to the screen size which has not been adjusted by the screen adjustment operation is obtained; the second display interface is displayed underneath the third image while displaying the third image; during the execution process of the screen adjustment operation, controlling the third image and the second display interface to perform the scaling operation through the system animation view, so as to make the size of the third image and the second display interface match the screen size. In the process of the scaling operation, the transparency of the third image is adjusted from 100% to 0, and the transparency of the second display interface is adjusted from 0 to 100%.

In the embodiment, the system determines whether the foreground application has performed the adaption of the transition animation through detecting whether the preset identifier sent by the foreground application to the application framework layer carries a window creation request. When the application was set at the phase of development to support the adaptive play of the transition animation, adding a flag bit in the window creation request which is sent to the application framework layer by the foreground application. On the contrary, when the system detects that no flag bit is carried in the window creation request, determines that the foreground application does not support the adaptive play of the transition animation. In this case, it is available to realize smooth transition through set some animation on a system level, for example, at the beginning of executing the screen adjustment operation, taking a screenshot of the display picture of the current screen to obtain the third image; acquiring the first display interface of the foreground application which has been adjusted by the adjustment operation, performing contracting operation to the first display interface, a second display interface corresponding to the screen size which has not been adjusted by the screen adjustment operation is obtained; the second display interface is displayed underneath the third image while displaying the third image; during the execution process of the screen adjustment operation, controlling the third image and the second display interface to perform the scaling operation through the system animation view, so as to make the size of the third image and the second display interface match the screen size, for example, in the process of the stretching operation, both the third image and the second display interface are controlled simultaneously to stretch as the screen is stretched, wherein, in the process of the scaling operation, the transparency of the third image is adjusted from 100% to 0, and the transparency of the second display interface is adjusted from 0 to 100%, the third image gradually disappears, and the second display interface which is underneath the third image is displayed.

The transition animation is achieved on the system level in this embodiment. Although the transition of the screen can be achieved in this way, the smoothness and the adaptability for the displaying contents may be weaker. For example, the displaying contents acquired in the first display interface may still be the one at the beginning of the adjustment operation, therefore, this technical solution may only be configured to the occasions that the foreground application is not adaptive. Compared to this, setting the transition animation which is adaptive for the contents of the application in the application level mentioned above may has higher smoothness, and better adaptability for the contents, the users can intuitively feel the stepless display of the displaying contents in the process of the screen adjustment operation, and there will be no display defects such as the screen flicker, blurry screen and ghosting.

A display control apparatus is further provided in the embodiments of the present disclosure, the apparatus includes: a program determination module, which is configured to determine the foreground application when the electronic device is detected to start to execute the screen adjustment operation, wherein the screen adjustment operation is configured to adjust the screen size of the flexible display screen; an animation play module, which is configured to control the foreground application to play the transition animation in the execution process of the screen adjustment operation, wherein in order to adapt the display content to the screen size, the size of the display content of the transition animation is dynamically adjusted with the change of the screen size; a window drawing module, which is configured to redraw and display the window of the foreground application according to screen size which has been adjusted by the screen adjustment operation when the screen adjustment operation is ended.

In some embodiments, the window drawing module can be further configured to draw the display content of the transition animation in real time according to the display picture of the foreground application in the process of playing the transition animation.

In some embodiments, the animation play module can be further configured to: take a screenshot of the display picture of the current screen so as to obtain the first image while it is detected that the electronic device starts to execute the screen adjustment operation; display the first image, furthermore control the foreground application to draw the transition animation; and when drawing the transition animation is completed, terminate the display of the first image and play the transition animation until the screen adjustment operation is ended.

In some embodiments, the window drawing module can be further configured to: take a screenshot of the display picture of the current screen when the screen adjustment operation is ended so as to obtain the second image; display the second image, and redraw and rearrange the window of the foreground application according to the screen size which has been adjusted by the screen adjustment operation; when the redrawing is completed, terminate the display of the second image and display the redrawn window of the foreground application.

In some embodiments, the window drawing module can be further configured to: determine the maximum screen display size in the process of the screen adjustment operation, the maximum screen display size is set as the target size of the foreground application; control the foreground application to play the transition animation in the window with the target size in the process of the screen adjustment operation.

In some embodiments, the screen adjustment operation can be the telescopic operation, the telescopic operation may include the stretching operation and the contracting operation; the window drawing module can be further configured to: when the screen adjustment operation is the stretching operation, determine a first screen display size which has been stretched by the stretching operation, and the first screen display size is set as the target size of the window of the foreground application; when the screen adjustment operation is the contracting operation, acquire the second screen size before the contracting operation is performed, and the second screen size is set as the target size of the window of the foreground application.

In some embodiments, the animation play module can be further configured to: detect whether the foreground application supports the adaptive play of the transition animation; in response to the foreground application supporting the adaptive play of the transition animation, control the foreground application to play the transition animation in the execution process of the screen adjustment operation; otherwise, take a screenshot of the display picture of the current screen to obtain the third image; acquire the first display interface of the foreground application which has been adjusted by the screen adjustment operation, perform the scaling operation to the first display interface to obtain the second display interface which is adaptive to the screen size which has not been adjusted by the screen adjustment operation; display the third image, and display the second display interface underneath the third image; control the scaling operation of the third image and the second display interface through the system animation view during the execution process of the screen adjustment operation, so as to make the size of the third image and the second display interface match the screen size, wherein in the process of the scaling operation, the transparency of the third image is adjusted from 100% to 0, and adjusting the transparency of the second display interface from 0 to 100%.

In some embodiments, the animation play module can be further configured to: detect that whether the window creation request which is sent to the application framework layer by the foreground application carries the reset identifier, wherein, in response to the window creation request carrying the reset identifier, it is determined that the foreground application supports the adaptive play of the transition animation; otherwise, it is determined that the foreground application does not support the adaptive play of the transition animation.

Figure 8:
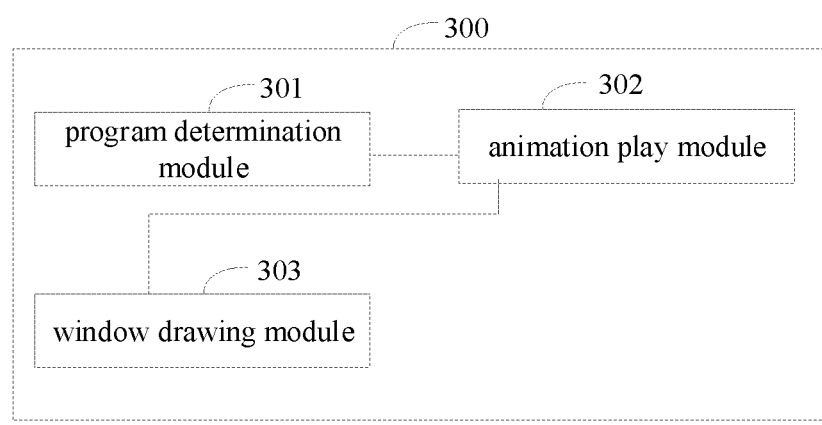
FIG. 8 is a schematic diagram of construction of a display control apparatus provided by some embodiments of the present disclosure.

A display control apparatus is further provided in the embodiments of the present disclosure. As shown in FIG. 8, FIG. 8 is a schematic view of construction of a display control apparatus provided by some embodiments of the present disclosure. The display control apparatus 300 for an electronic device may include a program determination module 301, an animation play module 302 and a window drawing module 303. The program determination module 301 is configured to determine the foreground application when the electronic device is detected to start to executing the screen adjustment operation, wherein, the screen adjustment operation is configured to adjust the screen size of the flexible display screen. The animation play module 302 is configured to control the foreground application to play the transition animation in the execution process of the screen adjustment operation, wherein, in order to adapt the display content to the screen size, the size of the display content of the transition animation is dynamically adjusted with the change of the screen size. The window drawing module 303 is configured to redraw and display the window of the foreground application according to screen size which has been adjusted by the screen adjustment operation when the screen adjustment operation is ended.

It should be noted that the display control apparatus provided in the embodiment belongs to the same idea as the display control method in the above embodiment. Through the display control apparatus, any method provided in the display control method embodiment can be realized. The specific implementation process is detailed in the display control method embodiment and will not be described here.

As can be known from the above, the display control apparatus provided in the embodiments of the present disclosure realizes the transition effect through animation during the process of the screen adjustment operation, avoids the abrupt change caused by the change of the size of the display interface in the process of switching from a big screen to a small screen or from a small screen to a big screen, and realizes the smooth switching of the display interface.

Figure 9:
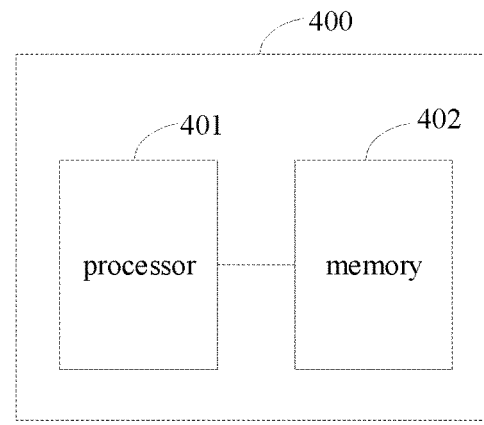
FIG. 9 is a schematic diagram of a first type of electronic device provided by some embodiments of the present disclosure.

An electronic device is further provided in the embodiments of the present disclosure. The electronic device can be a smart phone, a tablet computer, etc. As shown in FIG. 9. FIG. 9 is a schematic view of a first type of electronic device provided by some embodiments of the present disclosure. The electronic device 400 may include a processor 401 and a memory 402. Wherein, the processor 401 is electrically connected to the memory 402.

The processor 401 is the control center of the electronic device 400. It connects various parts of the entire electronic device 400 through various interfaces and lines. By running or calling the computer program stored in the memory 402 and calling the data stored in the memory 402, it performs various functions of the electronic device 400 and processes the data, so as to carry out overall monitoring of the electronic device 400.

The memory 402 can be configured to store computer programs and data. The memory 402 stores computer programs that include instructions that can be executed in the processor 401. The computer programs can make up various functional modules. The processor 401 performs various functional applications and data processing by calling computer programs stored in the memory 402.

In this embodiment, the processor 401 in the electronic device 400 will load the instructions corresponding to the process of one or more computer programs into the memory 402, and the processor 401 will run the computer programs stored in the memory 402 to achieve various functions according to the following operations: when it is detected that the electronic device 400 starts to execute the screen adjustment operation, the foreground application is determined; the foreground application is controlled to play the transition animation in the execution process of the screen adjustment operation; when the screen adjustment operation is ended, the window of the foreground application is redrawn and displayed according to the screen size which has been adjusted by the screen adjustment operation.

Figure 10:
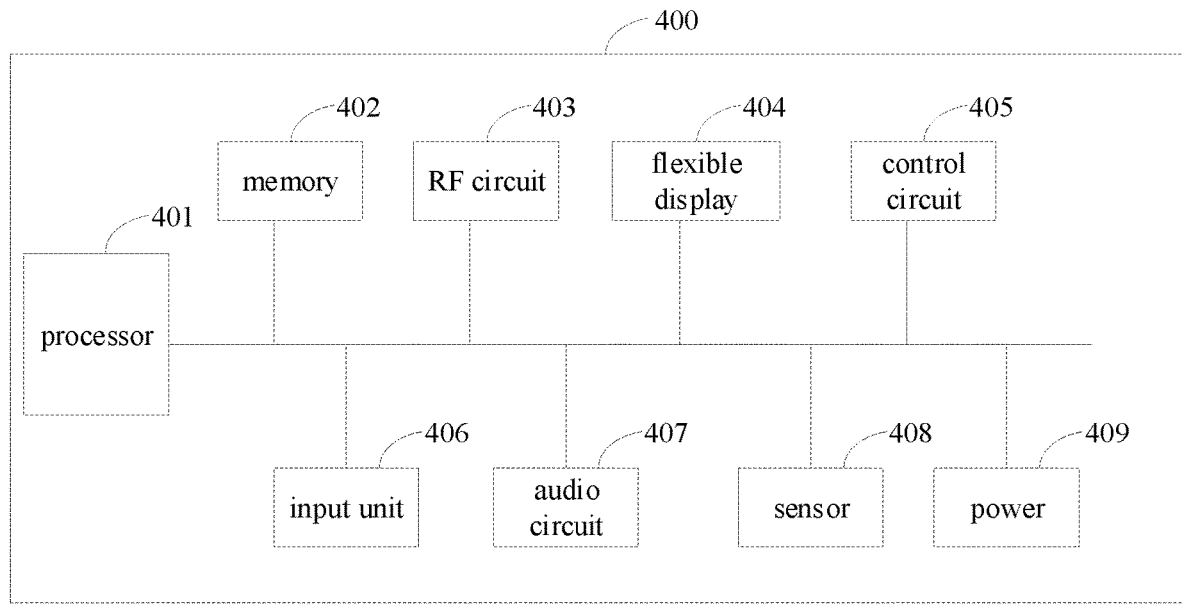
FIG. 10 is a schematic diagram of a second type of electronic device provided by some embodiments of the present disclosure.

In some embodiments, as shown in FIG. 10. FIG. 10 is a schematic view of a second type of electronic device provided by some embodiments of the present disclosure. The electronic device 400 further includes: a RF circuit 403, a flexible display screen 404, a control circuit 405, an input unit 406, an audio circuit 407, a sensor 408 and a power 409. The processor 401 is electrically connected to the RF circuit 403, the flexible display screen 404, the control circuit 405, the input unit 406, the audio circuit 407, the sensor 408 and the power 409.

The RF circuit 403 can be configured to send and receive RF signals for wireless communication with network devices or other electronic devices.

The flexible display screen 404 can be configured to display information entered by the users or provided to the users as well as various graphical user interfaces of the electronic device 400, which can be composed of images, text, icons, videos and any combination of them.

The control circuit 405 is electrically connected with the flexible display screen 404, which is configured to control the flexible display screen 400 to display information.

The input unit 406 can be configured to receive inputs like numeric information, character information, or user characteristic information (such as fingerprints) and to generate keyboard, mouse, joystick, optical, or trackball signal inputs related to user settings and functional controls. The input unit 406 can include a fingerprint recognition module.

The audio circuit 407 can provide an audio interface between users and the electronic device through a loudspeaker and a microphone. The audio circuit 407 may include the microphone. The microphone is electrically connected to the processor 401. The microphone can be configured to receive voice messages input by users.

The sensor 408 can be configured to collect external environment information. The sensor 408 can include one or more sensors such as an ambient brightness sensor, an acceleration sensor, a gyroscope, etc.

The power 409 can be configured to supply power to various components of the electronic device 400. In some embodiments, the power 409 can be logically connected to the processor 401 through a power management system to manage charging, discharge, and power consumption management, etc.

Although not shown in the figure, the electronic device 400 can also include a camera, a Bluetooth module or the like, which will not be detailed here.

In this embodiment, the processor 401 in the electronic device 400 may load the instructions corresponding to the process of one or more computer programs into the memory 402, and the processor 401 may run the computer programs stored in the memory 402 to realize various functions according to the following operations: when it is detected that an electronic device starts to execute a screen adjustment operation, a foreground application is determined; the foreground application is controlled to play transition animation in an execution process of the screen adjustment operation; when the screen adjustment operation is ended, the window of the foreground application is redrawn and displayed according to the screen size which has been adjusted by the screen adjustment operation.

As can be known from the above, the display control apparatus provided in the embodiment of the present disclosure realizes the transition effect through animation during the process of the screen adjustment operation, avoiding the abrupt change caused by the change of the size of the display interface in the process of switching from a big screen to a small screen or from a small screen to a big screen.

In some embodiments of the present disclosure, a non-transitory computer-readable storage medium is provided. A computer program is stored on the non-transitory computer-readable storage medium. In response to being executed by a computer, the computer executes the display control method described in any of the above embodiments.

It should be noted that all or part of the operations in the various methods in which the above embodiments can be understood by common technicians in the art can be accomplished by instructing the relevant hardware through the computer program, and the computer program can be stored in the non-transitory computer-readable storage medium, which may include but not be limited to: a Read Only Memory (ROM), a Random Access Memory (RAM), a disk, a CD or the like.

Furthermore, the terms "first", "second" and "third" in this disclosure are used to distinguish between different objects and not to describe a particular order. Furthermore, the terms "including" and "having", and any variation thereof, are intended to cover non-exclusive inclusion. For example, a process, a method, a system, a product or a device comprising a series of operations or modules is not restricted to the listed operations or modules, but some embodiments also include operations or modules not listed, or some embodiments also include other operations or modules inherent to these processes, methods, products or devices.

The display control method and the non-transitory computer-readable storage medium, and the electronic device provided in the embodiments of the present disclosure are described in detail above. The above embodiments are only several embodiments of the present disclosure that have relatively specific and detailed description, and should not be understood as a limitation on the scope of the present disclosure. It should be noted that, for those skilled in the art, some modifications and improvements may be obtained without departing from the concept of the present disclosure, these modifications and improvements belong to the protection scope of the present disclosure.

What is claimed is:

1. A display control method, performed by an electronic device with a flexible display screen, and comprising:
   determining a foreground application in response to detecting that the electronic device starts to execute a screen adjustment operation, wherein the screen adjustment operation is configured to adjust the screen size of the flexible display screen;
   controlling the foreground application to play a transition animation in an execution process of the screen adjustment operation, wherein the size of display content of the transition animation is dynamically adjusted with the change of the screen size to adapt the display content to the screen size; and
   redrawing and displaying the window of the foreground application according to the screen size which has been adjusted by the screen adjustment operation in response to the screen adjustment operation being ended;
   wherein, before the controlling the foreground application to play the transition animation in an execution process of the screen adjustment operation, the method comprises:
   detecting whether the foreground application supports the adaptive play of the transition animation;
   in response to the foreground application supporting the adaptive play of the transition animation, controlling the foreground application to play the transition animation in the execution process of the screen adjustment operation;
   otherwise, taking a screenshot of the display picture of a current screen to obtain a third image;
   acquiring a first display interface of the foreground application which has been adjusted by the screen adjustment operation, performing a scaling operation to the first display interface to obtain a second display interface which is adaptive to the screen size which has not been adjusted by the screen adjustment operation;
   displaying the third image, and displaying the second display interface underneath the third image; and
   controlling the scaling operation of the third image and the second display interface through a system animation view during the execution process of the screen adjustment operation, so as to make the size of the third image and the second display interface match the screen size, wherein, in the process of the scaling operation, the transparency of the third image is adjusted from 100% to 0, and the transparency of the second display interface is adjusted from 0 to 100%.

2. The method according to claim 1, wherein, the method further comprises:
drawing the display content of the transition animation in real time according to the display picture of the foreground application in the process of playing the transition animation.

3. The method according to claim 2, wherein, before the controlling the foreground application to play a transition animation in an execution process of the screen adjustment operation, the method further comprises:
taking a screenshot of the display picture of the current screen to obtain a first image in response to detecting that the electronic device starts to execute the screen adjustment operation; and
wherein, the controlling the foreground application to play the transition animation in an execution process of the screen adjustment operation, comprises:
displaying the first image and controlling the foreground application to draw the transition animation; and
terminating the display of the first image and playing the transition animation until the screen adjustment operation is ended, in response to drawing the transition animation is completed.

4. The method according to claim 2, wherein, the redrawing and displaying the window of the foreground application according to the screen size which has been adjusted by the screen adjustment operation in response to the screen adjustment operation being ended, comprises:
taking a screenshot of the display picture of the current display to obtain a second image in response to the screen adjustment operation being ended;
displaying the second image, redrawing and rearranging the window of the foreground application according to the screen size which has been adjusted by the screen adjustment operation; and
terminating the display of the second image and displaying the redrawn window of the foreground application in response to the redrawing being completed.

5. The method according to claim 4, wherein, the controlling the foreground application to play a transition animation in an execution process of the screen adjustment operation, comprises:
determining the maximum screen display size in the process of the screen adjustment operation, and setting the maximum screen display size as the target size of the window of the foreground application; and
controlling the foreground application to play the transition animation in the window with the target size in the execution process of the screen adjustment operation.

6. The method according to claim 5, wherein, the screen adjustment operation is a telescopic operation, and the telescopic operation comprises a stretching operation and a contracting operation;
wherein, the determining the maximum screen display size in the process of the screen adjustment operation and setting the maximum screen display size as the target size of the window of the foreground application, comprises:
determining a first screen display size which has been stretched by the stretching operation, and setting the first screen display size as the target size of the window of the foreground application, in response to the screen adjustment operation being the stretching operation; and acquiring a second screen display size which has not been contracted by the contracting operation, and setting the second screen display size as the target size of the window of the foreground application, in response to the screen adjustment operation being the contracting operation.

7. The method according to claim 1, wherein, the detecting whether the foreground application supports the adaptive play of the transition animation, comprises:
detecting whether a preset identifier is carried in a window creation request sent by the foreground application program to an application framework layer, wherein:
in response to the window creation request carrying the preset identifier, it is determined that the foreground application program supports the adaptive play of the transition animation;
otherwise, it is determined that the foreground application program does not support the adaptive play of the transition animation.

8. A non-transitory computer-readable storage medium having stored instructions that is executed by a processor of a computer, cause the processor to:
determine a foreground application in response to detecting that the electronic device starts to execute a screen adjustment operation, wherein the screen adjustment operation is configured to adjust the screen size of the flexible display screen;
control the foreground application to play the transition animation in an execution process of the screen adjustment operation, wherein the size of display content of the transition animation is dynamically adjusted with the change of the screen size to adapt the display content to the screen size; and
redraw and display the window of the foreground application according to the screen size which has been adjusted by the screen adjustment operation in response to the screen adjustment operation being ended;
wherein, before the controlling the foreground application to play the transition animation in an execution process of the screen adjustment operation, when executed by the processor, cause the processor further to:
detect whether the foreground application supports the adaptive play of the transition animation;
in response to the foreground application supporting the adaptive play of the transition animation, control the foreground application to play the transition animation in the execution process of the screen adjustment operation;
otherwise, take a screenshot of the display picture of the current screen to obtain a third image;
acquire a first display interface of the foreground application which has been adjusted by the screen adjustment operation, perform a scaling operation to the first display interface to obtain a second display interface which is adaptive to the screen size which has not been adjusted by the screen adjustment operation;
display the third image, and display the second display interface underneath the third image; and
control the scaling operation of the third image and the second display interface through a system animation view during the execution process of the screen adjustment operation, so as to make the size of the third image and the second display interface match the screen size, wherein, in the process of the scaling operation, the transparency of the third image is adjusted from 100% to 0, and the transparency of the second display interface is adjusted from 0 to 100%.

9. The non-transitory computer-readable storage medium according to claim 8, the instructions further comprise:
draw the display content of the transition animation in real time according to the display picture of the foreground application in the process of playing the transition animation.

10. The non-transitory computer-readable storage medium according to claim 9, wherein, before controlling the foreground application to play the transition animation in an execution process of the screen adjustment operation, the instructions that, when executed by the processor of the computer, cause the processor further to:
take a screenshot of the display picture of the current screen to obtain a first image in response to detecting that the electronic device starts to execute the screen adjustment operation; and
wherein, controlling the foreground application to play the transition animation in an execution process of the screen adjustment operation, when executed by the processor, cause the processor further to:
display the first image and controlling the foreground application to draw the transition animation; and
terminate the display of the first image and playing the transition animation until the screen adjustment operation is ended, in response to drawing the transition animation is completed.

11. The non-transitory computer-readable storage medium according to claim 9, wherein, redrawing and displaying the window of the foreground application according to the screen size which has been adjusted by the screen adjustment operation in response to the screen adjustment operation being ended, when executed by the processor, cause the processor further to:
take a screenshot of the display picture of the current display to obtain a second image in response to the screen adjustment operation being ended;
display the second image, redrawing and rearranging the window of the foreground application according to the screen size which has been adjusted by the screen adjustment operation; and
terminate the display of the second image and displaying the redrawn window of the foreground application in response to the redrawing being completed.

12. The non-transitory computer-readable storage medium according to claim 11, wherein, controlling the foreground application to play the transition animation in an execution process of the screen adjustment operation, when executed by the processor, cause the processor further to:
determine the maximum screen display size in the process of the screen adjustment operation, and setting the maximum screen display size as the target size of the window of the foreground application; and
control the foreground application to play the transition animation in the window with the target size in the execution process of the screen adjustment operation.

13. The non-transitory computer-readable storage medium according to claim 12, wherein, the screen adjustment operation is a telescopic operation, and the telescopic operation comprises a stretching operation and a contracting operation;
wherein, determining the maximum screen display size in the process of the screen adjustment operation and setting the maximum screen display size as the target size of the window of the foreground application, when executed by the processor, cause the processor further to:
determine a first screen display size which has been stretched by the stretching operation, and setting the first screen display size as the target size of the window of the foreground application, in response to the screen adjustment operation being the stretching operation; and
acquire a second screen display size which has not been contracted by the contracting operation, and setting the second screen display size as the target size of the window of the foreground application, in response to the screen adjustment operation being the contracting operation.

14. The non-transitory computer-readable storage medium according to claim 8, wherein, detecting whether the foreground application supports the adaptive play of the transition animation, when executed by the processor, cause the processor further to:
detect whether a preset identifier is carried in a window creation request sent by the foreground application program to an application framework layer, wherein:
in response to the window creation request carrying the preset identifier, it is determined that the foreground application program supports the adaptive play of the transition animation;
otherwise, it is determined that the foreground application program does not support the adaptive play of the transition animation.

15. An electronic device, comprising a processor and a memory configured to store instructions which, when executed by the processor, cause the processor to:
determine a foreground application in response to detecting that an electronic device starts to execute a screen adjustment operation; wherein, the screen adjustment operation is configured to adjust the screen size of the flexible display screen;
control the foreground application to play the transition animation in an execution process of the screen adjustment operation; wherein, the size of display content of the transition animation is dynamically adjusted with the change of the screen size to adapt the display content to the screen size; and
redraw and display the window of the foreground application according to the screen size which has been adjusted by the screen adjustment operation in response to the screen adjustment operation being ended;
wherein, before the controlling the foreground application to play the transition animation in an execution process of the screen adjustment operation, when executed by the processor, cause the processor further to:
detect whether the foreground application supports the adaptive play of the transition animation;
in response to the foreground application supporting the adaptive play of the transition animation, control the foreground application to play the transition animation in the execution process of the screen adjustment operation;
otherwise, take a screenshot of the display picture of the current screen to obtain a third image;
acquire a first display interface of the foreground application which has been adjusted by the screen adjustment operation, perform a scaling operation to the first display interface to obtain a second display interface which is adaptive to the screen size which has not been adjusted by the screen adjustment operation;
display the third image, and display the second display interface underneath the third image; and control the scaling operation of the third image and the second display interface through a system animation view during the execution process of the screen adjustment operation, so as to make the size of the third image and the second display interface match the screen size, wherein, in the process of the scaling operation, the transparency of the third image is adjusted from 100% to 0, and the transparency of the second display interface is adjusted from 0 to 100%.

16. The electronic device according to claim 15, the instructions further cause the one or more processors to:
draw the display content of the transition animation in real time according to the display picture of the foreground application in the process of playing the transition animation.

17. The electronic device according to claim 16, the instructions further cause the one or more processors to:
take a screenshot of the display picture of the current screen to obtain a first image in response to detecting that the electronic device starts to execute the screen adjustment operation; and
wherein, the control the foreground application to play the transition animation in an execution process of the screen adjustment operation, comprises:
displaying the first image and controlling the foreground application to draw the transition animation; and
terminating the display of the first image and playing the transition animation until the screen adjustment operation is ended, in response to drawing the transition animation is completed.

* * * * *